(12) United States Patent
Dudziak et al.

(10) Patent No.: US 7,315,684 B2
(45) Date of Patent: Jan. 1, 2008

(54) DEVICE FOR PRODUCING A HOLLOW PROFILE

(75) Inventors: Kai-Uwe Dudziak, Stelle (DE); Stefan Schwarz, Luenen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/581,793

(22) PCT Filed: Nov. 10, 2004

(86) PCT No.: PCT/EP2004/012693

§ 371 (c)(1),
(2), (4) Date: Mar. 13, 2007

(87) PCT Pub. No.: WO2005/053869

PCT Pub. Date: Jun. 16, 2005

(65) Prior Publication Data

US 2007/0172534 A1    Jul. 26, 2007

(30) Foreign Application Priority Data

Dec. 4, 2003    (DE) .................. 103 56 535

(51) Int. Cl.
*G02B 6/00*    (2006.01)
*B21D 22/00*    (2006.01)

(52) U.S. Cl. .......................................... 385/147; 72/55

(58) Field of Classification Search ............ 385/147; 72/55; 264/163; 425/289
See application file for complete search history.

(56) References Cited

U.S. PATENT DOCUMENTS

| | | | |
|---|---|---|---|
| 6,434,989 B1 * | 8/2002 | Hardtke | 72/55 |
| 6,662,447 B2 * | 12/2003 | Kuschel et al. | 29/890.08 |
| 2001/0037573 A1 * | 11/2001 | Kuschel et al. | 29/890.148 |

FOREIGN PATENT DOCUMENTS

| | | |
|---|---|---|
| DE | 197 52 772 C2 | 9/1999 |
| DE | 197 33 474 C2 | 12/1999 |
| DE | 199 11 125 C1 | 11/2000 |
| DE | 199 09 928 A1 | 12/2000 |
| DE | 199 09 928 C2 | 8/2001 |
| DE | 195 30 055 B4 | 8/2004 |
| DE | 195 30 056 B4 | 9/2004 |

OTHER PUBLICATIONS

International Search Report dated Feb. 3, 2004 including English Translation of Relevant Portion (Eight (8) pages).

* cited by examiner

*Primary Examiner*—Sarah Song
(74) *Attorney, Agent, or Firm*—Crowell & Moring LLP

(57) ABSTRACT

A device for producing an essentially T-shaped hollow profile or a hollow profile provided with at least one branch. The device may have a multipart mold which is intended for internal high pressure forming, in which a hollow profile having at least one initially dome-like branch can be produced. The device may also have a tool at the branch, this tool being designed for opening the branch at the end face after the forming operation. The tool is designed as a cutting device having a parting slide displaceable essentially transversely to the axis of the branch.

15 Claims, 2 Drawing Sheets

DEVICE FOR PRODUCING A HOLLOW PROFILE

This application is a national phase application of International application PCT/EP2004/012693 filed Nov. 10, 2004 and claims the priority of German application No. 103 56 535.3, filed Dec. 4, 2003, the disclosures of which are expressly incorporated by reference herein.

BACKGROUND AND SUMMARY OF THE INVENTION

The present invention relates to a device for producing an essentially T-shaped hollow profile or a hollow profile provided with at least one branch.

DE 199 09 928 C2 discloses a device for partly or completely severing a dome-like branch of a hollow body formed according to the internal high pressure forming process. The device has an encircling cutting edge, assigned to which is a supporting body which is arranged so as to be movable in such a way that it supports that region of the branch which is being deformed during the cutting operation, and the supporting body being inserted into a recess of the tool and surrounding the branch. A retaining ring adjoins the cutting edge. For the purpose of the internal high pressure forming of the hollow body, the device, the cutting ring and the retaining ring therefore form the requisite bearing surfaces. For the purpose of severing the dome-like branch, the retaining ring is axially displaced, so that the deforming region can radially expand and extend into the recess. The dome-like branch is therefore first shaped and then severed by the cutting edge released by the axially displaced retaining ring, it being possible for structural disturbances to occur in the parting region due to the severing.

DE 195 30 056 A1 discloses a method and a device for producing T-shaped hollow bodies having at least one dome-like branch. The method for producing a hollow body produced according to the internal high pressure forming process provides for a dome cap which is arranged at the end on the dome-like branch to be punched out, at an internal pressure increased relative to the maximum production internal pressure, by the counter holder which forms during the forming and supports the dome. For this purpose, a head-side end face of the counter holder is dimensioned to be larger than an active supporting surface and has a cutting edge bordering the active supporting surface in an encircling, collar-like manner. The counter holder, which normally serves to support the dome, is therefore also used at the same time for punching out the dome cap.

DE 195 30 055 A1 discloses a method and a device for producing double-walled apertures in components according to the internal high pressure forming process. In this case, a dome-like branch is imposed by the internal high pressure and the resulting dome cap is inverted inward by a first counter holder, supporting the dome developing during the forming, against a second counter holder supporting the component opposite the dome. The inversion is continued until the dome cap and that surface supported by the second counter holder form a double sheet layer, whereupon the dome cap is notched by the first counter holder, both counter holders are moved in the inversion direction, and sheet metal blanks are punched out of the double sheet layer. As a result, the forming of one or more dome-like branches, which is known per se in the case of internal high pressure forming, can be used for producing completely finished bosses in the hollow-body molded part.

DE 197 33 474 C2 discloses a method and a device for producing secondary molded elements on hollow profiles, the secondary molded elements being locally shaped by expansion of the hollow profile with a high fluid pressure generated in the latter and being in a closed form after completion of the production process, so that the secondary molded elements have to be opened by a further machining step.

DE 197 52 772 C2 discloses a method of producing an air-gap-insulated exhaust pipe provided with a branch piece. In this case, a connected profile is produced from two hollow profiles, which can be pushed one inside the other, by subsequent internal high pressure forming, this connected profile having a dome-like branch which is closed at the end of the production process. In order to open the branch produced, a dome cap at the end face is removed in a further step.

The present invention deals with the problem of specifying an improved embodiment for a device of the type mentioned at the beginning, this embodiment in particular allowing hollow profiles of high quality to be produced with at the same time high reproducibility.

In a device for producing an essentially T-shaped hollow profile, or a hollow profile provided with a branch, according to the internal high pressure forming process, the invention is based on the general idea of arranging in the region of the branch a tool which is designed as a cutting device and which is able to sever the branch by means of a parting slide displaceable essentially transversely to the axis of the branch. The device in this case has a multipart mold with which the hollow profile having at least one initially dome-like branch can be produced. Due to the design of the tool as a cutting device having a displaceable parting slide, an especially precise parting process can be achieved compared with the conventional opening of the branch.

The hitherto opening of the branches at the end face, which opening was achieved, for example, by tearing open the hollow profile under excess pressure at regions of cutting edges, may lead to an uneven hole pattern. At the same time, exact reproducibility and, associated therewith, a uniformly high quality are only possible to a limited extent with the known parting methods.

On the other hand, due to the solution according to the invention, the branch is cut off precisely by the parting slide and thus a component quality of the hollow profile considerably improved in the region of the parting location can be achieved. The cut quality can be additionally increased by a predeterminable drive speed of the parting slide and/or by an internal high pressure possibly applied during the parting. Furthermore, the cutting device ensures that a virtually uniform cut edge is obtained, so that the reproducibility can be markedly increased compared with conventional parting methods. At the same time, the invention enables the branch to be opened while still in the device directly after the forming operation, so that it is not necessary to remove the hollow profile from the device, and subsequent severing of the branch, for example by a laser or by a saw, is also not necessary, as a result of which the production process can be significantly rationalized.

According to an advantageous embodiment of the solution according to the invention, the parting slide is arranged inside a gap space which is present in the mold and through which a cavity passes transversely to the gap plane, this cavity being provided for shaping the branch. The arrangement of the parting slide inside the gap space ensures its exact fixing during the forming operation and guidance during the cutting operation without the need for a complicated mounting. This increases the robustness and the service life of the device according to the invention.

According to a further especially favorable embodiment, the parting slide has an opening which is orthogonal relative to the slide plane and through which the cavity provided for shaping the branch passes before the start of the parting operation, a marginal region of the opening forming a cutting edge. This offers the great advantage that the parting slide is arranged in the gap space during the parting operation in such a way that it projects at no point into the interior space which is defined by a shaping die impression of the device. The parting slide therefore in no way influences the process for forming the hollow profile or the process for shaping the dome-like branch. At the same time, the cutting edge at the marginal region of the opening ensures that the branch can be cut off directly after the forming process by displacement of the parting slide, thereby resulting in a very short production time overall.

The cutting edge may be designed to be interchangeable or as an integral part of the parting slide. An interchangeable cutting edge offers the advantage that, after a certain number of cutting operations, only the cutting edge has to be exchanged, whereas the rest of the parting slide, which is not impaired in its function by a worn cutting edge, can continue to be used. Especially in the case of hollow profiles of large diameters and thus in the case of parting slides of larger dimensions, this has a favorable effect on the ease of maintenance of the device, since only the cutting edge has to be exchanged and the possibly heavy parting slides can remain in the device. In contrast, in the case of hollow profiles or branches of small diameter, a parting slide having an integrated cutting edge is possibly more favorable, since it is simpler here to exchange the complete parting slide rather than laboriously carry out the exchange of the cutting edge.

According to a further favorable development of the solution according to the invention, the parting plane is arranged in a region between an end face region and a region at which the dome-like branch opens into the hollow profile. Due to the predefined arrangement of the parting plane, it is possible to sever the branch in each case at a desired plane and thereby determine a length of the branch by a corresponding arrangement of the parting plane. In this case, it is also conceivable for the parting plane to be arranged, in the limit case, at the end face region of the dome-like branch and for it to therefore cut off only an end-face dome cap without substantially shortening the length of the branch.

It goes without saying that the abovementioned features and the features still to be explained below can be used not only in the respectively specified combination but also in other combinations or on their own without departing from the scope of the present invention.

Preferred exemplary embodiments of the invention are shown in the drawings and are described in more detail below, the same designations designating identical or functionally identical or similar components.

Other objects, advantages and novel features of the present invention will become apparent from the following detailed description of the invention when considered in conjunction with the accompanying drawings for example.

DETAILED DESCRIPTION

Figure 1:
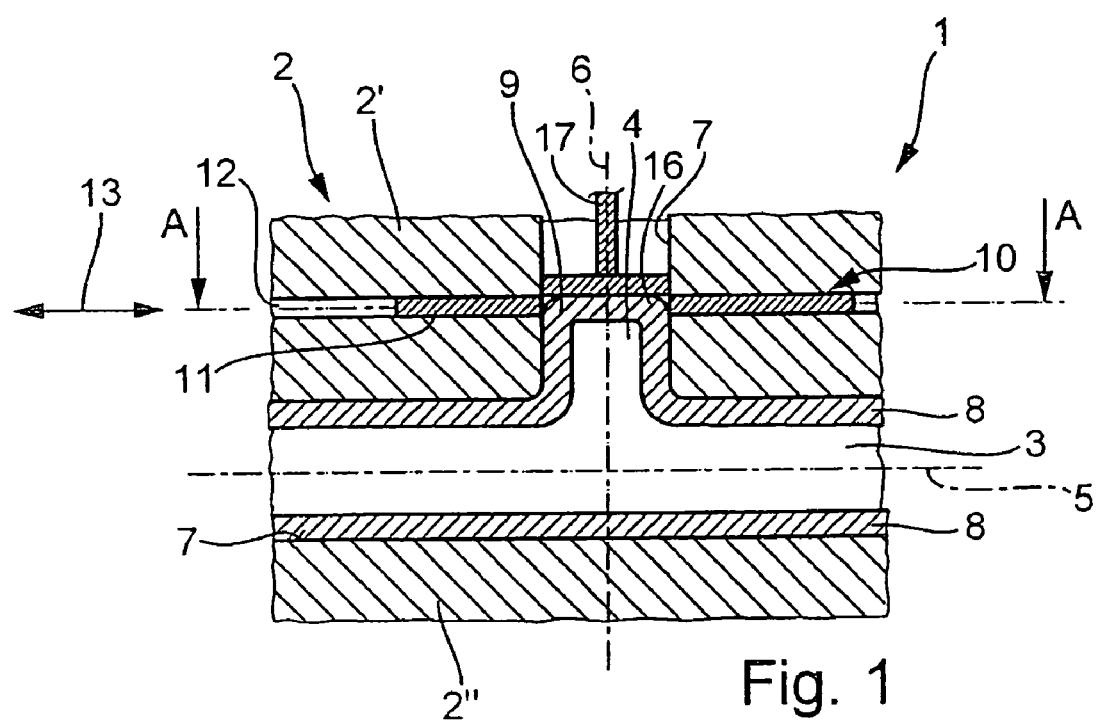
FIG. 1 shows a greatly simplified sectional illustration through a device according to an embodiment of the invention, with a cutting device in the end face region of a dome-like branch.

According to FIG. 1, a device 1 according to the invention has a multipart mold 2 which encloses an essentially elongated cavity 3 and a branch passage 4 running essentially transversely thereto. In this case, a first longitudinal axis 5 passes through the cavity 3, whereas the branch passage 4 has a second longitudinal axis 6 running essentially transversely to the first longitudinal axis 5. The cavity 3 and the branch passage 4 are enclosed by a shaping die impression 7, bearing against which after internal high pressure forming is a hollow profile 8 inserted into the device 1. The multipart mold 2, which consists, for example, of a top mold part 2' and of a bottom mold part 2" which can be connected thereto, can be opened in such a way that the hollow profile 8 can be removed without any problems after the forming process. In this case, the formed hollow profile 8 may have, for example, a circular or a polygonal cross section.

Figure 2:
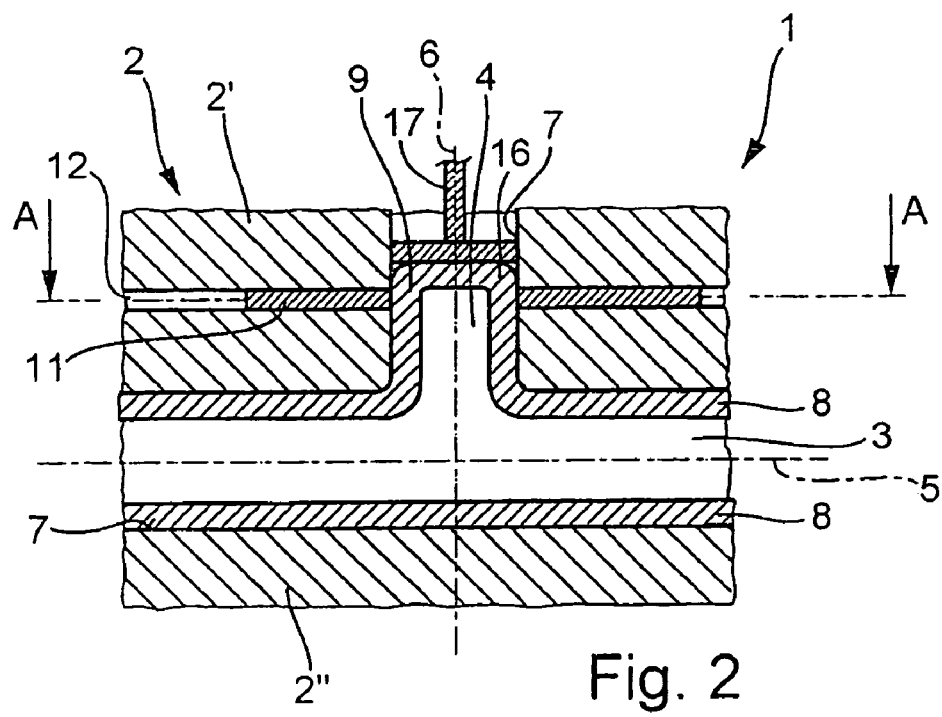
FIG. 2 shows an illustration as in FIG. 1 but with cutting device displaced in parallel.

Shown here according to FIGS. 1 and 2 is a production step in which the forming process has already been completed, it preferably being possible for the internal high pressure to still be applied. Due to the branch passage 4, the essentially T-shaped hollow profile 8, or hollow profile 8 provided with at least one dome-like branch or bulge 9, is produced from an original straight hollow profile blank after the forming. In order to prevent undesirable swelling of the dome-like branch 9 during the forming process, a drivable counter holder 17, for example a hydraulic plunger, which supports the branch 9 during the forming may be provided. It is conceivable in this case for the counter holder 17 to give way slowly in the effective direction of the internal high pressure during the forming process. Furthermore, at the branch 9, the device 1 has a tool 10 which serves to open the dome-like branch 9 at the end face after the forming operation. In this case, the tool 10 is designed as a cutting device having a parting slide 11 displaceable essentially transversely to the second longitudinal axis 6 of the branch 9 or the branch passage 4. Due to the counter holder 17, it is possible in this case to cut off a dome cap 16 without releasing the internal high pressure beforehand, since the counter holder 17 also ensures pressure sealing during the cutting operation. An especially precise cut is achieved as a result.

According to FIGS. 1 and 2, the parting slide 11 is arranged inside a gap space 12 in the top mold part 2' and is mounted so as to be movable in said gap space 12 in a displacement direction 13. Passing in turn through the gap space 12 transversely to the gap plane is a cavity (not designated in any more detail) of the mold 2, this cavity being provided for shaping the branch 9. In its position shown in FIGS. 1 and 2, the parting slide 11 is arranged in such a way that it does not project beyond the die impression 7 into the branch passage 4 and thus does not impair the hollow profile 8 during the forming process. By way of example, the parting slide 11, in this position, forms part of the shaping die impression 7, against which the hollow profile 8 bears during the forming process.

Figure 3:
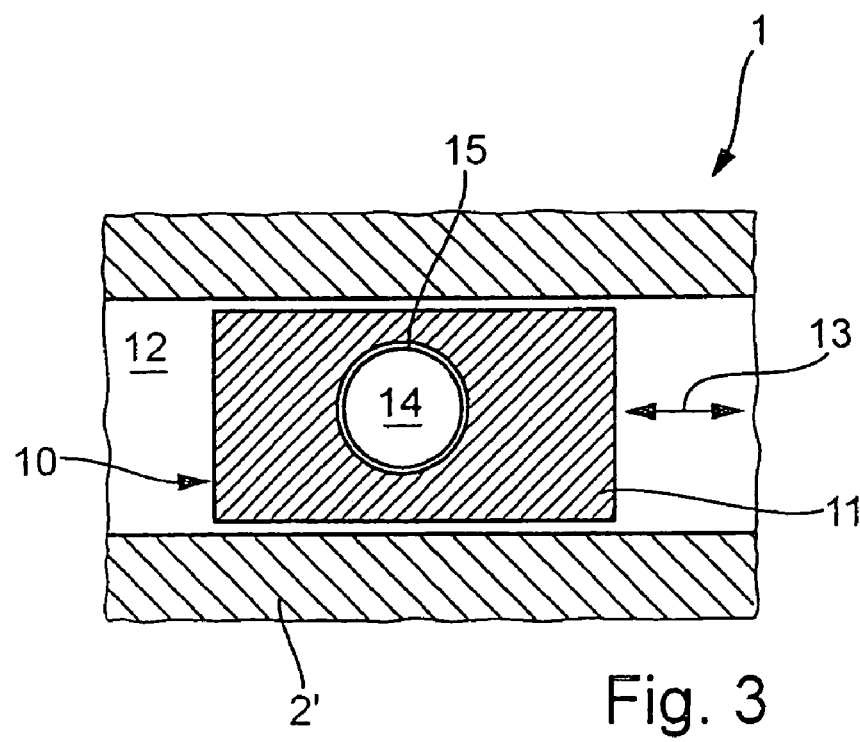
FIG. 3 shows a parting slide according to an embodiment of the invention, with an opening having an at least partly encircling cutting edge.
Figure 4:
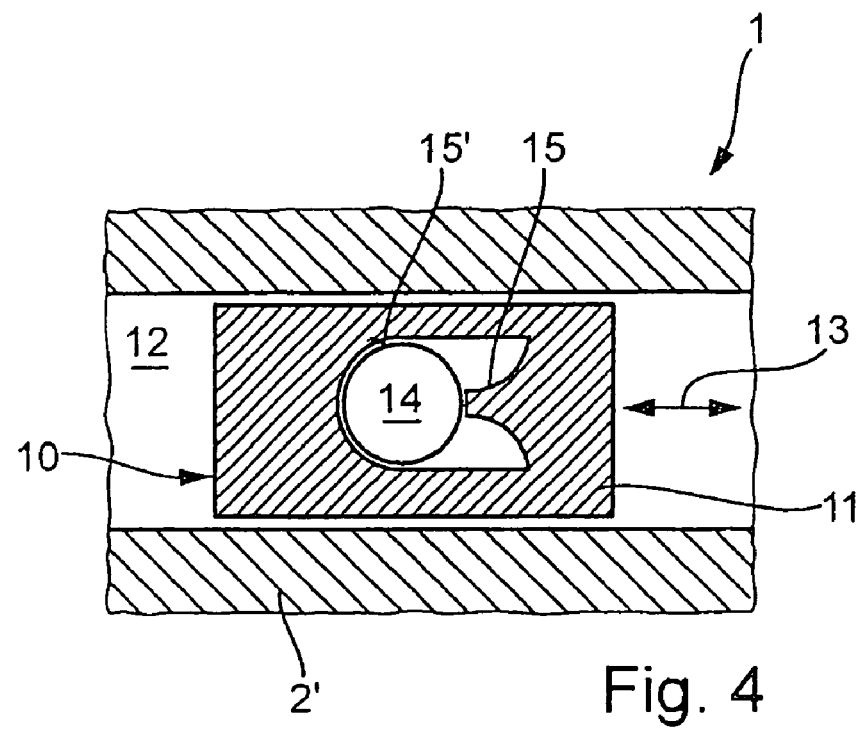
FIG. 4 shows an illustration as in FIG. 3 but with a different cutting edge.

According to FIGS. 3 and 4, the parting slide 11 has an opening 14 which is orthogonal relative to the slide plane and through which the cavity provided for the shaping of the dome-like branch 9 passes before the start of the parting operation. Before the start of the parting operation, i.e. during the forming operation, the opening 14 is ideally in alignment with the cross-sectional dimensions of the cavity provided for the shaping of the dome-like branch 9, the opening 14 and the branch 9 or the branch passage 4 ideally having an identical cross section at least in a certain region.

According to FIGS. 3 and 4, a marginal region of the opening 14 forms a cutting edge 15, with which the hollow profile 8 can be cut during the displacement of the parting slide 11 in the displacement direction 13. It is conceivable in this case for the cutting edge 15 to be arranged so as to partly or completely encircle the opening 14 on the parting slide 11, so that a cutting effect is obtained either during the displacement of the parting slide 11 from its initial position into a first end position or else, in the case of a completely encircling cutting edge 15, both when the parting slide 11 is displaced from its initial position into the first end position and when it is displaced backward into the initial position. Here, a completely encircling cutting edge 15 offers the great advantage that a cutting effect is achieved both when the parting slide 11 is being displaced forward and when it is being displaced back and, as a result, an especially exact cut edge can be achieved at the dome-like branch 9 of the hollow profile 8.

In this case, the configurations in both FIG. 3 and FIG. 4 represent only exemplary embodiments, other favorable embodiments or profiles of cutting edges 15 also being conceivable.

According to FIG. 4, the cutting edge 15 has a trapezoidal profile, the sides of the trapezium which are not parallel having a curvature, so that, during the cutting operation, the cutting forces in that region of the hollow profile 8 which is not optimally supported below the end dome cap 16 are reduced and, after the start of the cutting operation, are directed in an ever increasing proportion toward the die impression 7 of the branch passage 4. This enables deformation of the dome-like branch 9 due to the parting operation to be avoided or at least reduced.

According to FIG. 4, therefore, the hollow profile 8 is cut off by a displacement of the parting slide 11 to the left in the displacement direction 13, it being additionally possible, by means of a subsequent displacement of the parting slide 11 to the right, for the cut edge to be subsequently cut a second time by a semicircular cutting edge 15'. In contrast, according to FIG. 3, in the case of a completely encircling cutting edge 15, the hollow profile 8 is cut off by a displacement of the parting slide 11 alternatively to the right or left. In the case of a cutting edge 15 formed only in a certain region, a cutting action is effected by a displacement of the parting slide 11 either to the right or the left.

In general, it is conceivable for the cutting edge 15 to be designed to be interchangeable, which is especially effective with respect to the ease of maintenance, in particular in the case of parting slides 11 of large dimensions for cutting off large hollow profiles 8, since only the cutting edge 15 has to be removed and attached again without a complete exchange of the possibly heavy parting slide 11 being necessary. However, for devices 1 for cutting off hollow profiles 8 having smaller cross-sectional dimensions, a parting slide 11 in which the cutting edge 15 is an integral part of the parting slide 11 may be more favorable. In this case, after a predefined number of cutting operations, the complete parting slide 11 together with cutting edge 15 is removed and replaced by a new parting slide 11.

Depending on whether it is desired to cut off the dome-like branch 9 either at an end face region or else between the latter and a region at which the dome-like branch 9 opens into the hollow profile 8, a parting plane (not designated in any more detail) or the gap space 12 can be arranged at a more or less large parallel distance from the first longitudinal axis 5.

A method of producing the essentially T-shaped hollow profile 8 or the hollow profile 8 provided with at least one branch 9 is to be briefly described below:

In a first method step (not shown), a hollow profile blank is inserted into the cavity 3 of the device 1 and formed by applying an internal high pressure. In the process, the parting slide 11 is located in its initial position (cf. FIGS. 1 and 2), so that the hollow profile 8 can bear against the shaping die impression 7. In the process, the dome-like bulge 9 and thus the T-shaped configuration of the hollow profile 8 are formed in the region of the branch passage 4. In general, it is conceivable for it to be possible for the drivable counter holder 17 to be moved through the opening 14 in the parting slide 11 during the forming process. After the forming process, the dome-like branch 9 is cut off by a displacement movement of the parting slide 11 in the displacement direction 13, so that the hollow profile 8 is formed by internal high pressure at the end of the production process and the dome-like bulge 9 is open at the end face. The counter holder 17 may also be used for expelling the cut-off dome cap 16.

In summary, the essential features of the solution according to the invention can be characterized as follows:

The invention makes provision for a tool 10 to be designed as a cutting device in a device 1 for producing an essentially T-shaped hollow profile 8 or a hollow profile 8 provided with at least one branch 9, the cutting device being formed with a parting slide 11 displaceable transversely to the axis 6 of the branch 9. The device in this case has a multipart mold 2 which is intended for internal high pressure forming and with which the hollow profile 8 having at least one initially dome-like branch 9 can be produced. In this case, the tool 10 is arranged at the branch 9 or the branch passage 4 of the device 1 and is designed for opening the branch 9 at the end face after the forming operation.

The solution according to the invention therefore enables the dome-like bulge 9 to be opened after the forming operation and a component of uniformly high quality and reproducibility can therefore be produced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for producing a hollow profile having at least one branch, comprising:
   a multipart mold configured for internal high pressure forming of the hollow profile;
   a tool arranged to open an end of the at least one hollow profile branch after internal high pressure forming of the hollow profile;
   wherein the tool is a cutting device having a parting slide displaceable essentially transversely to a longitudinal axis of said branch to open said branch.

2. The device as claimed in claim 1, wherein
   the parting slide is arranged inside a gap in the mold, and a branch cavity of the mold passes through the gap transversely to the gap plane.

3. The device as claimed in claim 2, wherein the parting slide has an opening which is orthogonal relative to a sliding plane on which the parting slide is displaced and through which the branch cavity passes before the start of the parting operation, and a marginal region of the opening forms a cutting edge.

4. The device as claimed in claim 3, wherein the opening has a cross section which is essentially identical to a cross section of the branch cavity at least in the region where the branch cavity traverses the parting slide gap.

5. The device as claimed in claim 1, wherein the parting plane is arranged at an end face region of said branch.

6. The device as claimed in claim 4, wherein the parting plane is arranged at an end face region of said branch.

7. The device as claimed in claim 6, wherein a parting plane is located in a region between the end face region of the hollow profile and a region at which said branch opens into the hollow profile.

8. The device as claimed in claim 3, wherein the cutting edge is interchangeable.

9. The device as claimed in claim 7, wherein the cutting edge is interchangeable.

10. The device as claimed in claim 3, wherein the cutting edge is an integral part of the parting slide.

11. The device as claimed in claim 3, further comprising:

a drivable counter holder, wherein the drivable counter holder is located in said branch cavity and at least during the forming process provides support to said hollow profile branch.

12. The device as claimed in claim 11, wherein the counter holder is movable through the opening of the parting slide.

13. A method of producing a hollow profile having at least one branch, comprising the steps of:

forming a hollow profile by internal high pressure forming in a multipart mold having at least one branch;

opening an end of the at least one hollow profile branch after internal high pressure forming of the hollow profile by displacing a parting slide through a gap which is essentially transverse to, and intersects, a longitudinal axis of said branch.

14. The method as claimed in claim 13, wherein the parting slide has an opening which is orthogonal relative to a sliding plane on which the parting slide is displaced and through which the branch cavity passes before the start of the parting operation, and a marginal region of the opening forms a cutting edge.

15. The method as claimed in claim 14, wherein a drivable counter holder is located in said branch cavity and at least during the forming process provides support to said hollow profile branch.

* * * * *